(12) United States Patent
Donald et al.

(10) Patent No.: US 6,406,619 B1
(45) Date of Patent: Jun. 18, 2002

(54) THREE STAGE SEWAGE TREATMENT PLANT

(76) Inventors: Hubbard H. Donald; George E. Johnson, both of 2247 Hwy. 151 North, Downsville, LA (US) 71234

(*) Notice: Subject to any disclaimer, the term of this patent is extended or adjusted under 35 U.S.C. 154(b) by 0 days.

(21) Appl. No.: 09/615,165

(22) Filed: Jul. 13, 2000

Related U.S. Application Data

(60) Provisional application No. 60/143,463, filed on Jul. 13, 1999.

(51) Int. Cl.[7] ................................................. C02F 3/20
(52) U.S. Cl. ................ 210/151; 210/121; 210/170; 210/206; 210/207; 210/220; 210/260; 210/532.2; 137/576
(58) Field of Search ................................ 210/121, 150, 210/151, 205, 207, 202, 220, 258, 259, 532.1, 605, 631, 532.2, 170, 260; 137/576, 571

(56) References Cited

U.S. PATENT DOCUMENTS

| | | | |
|---|---|---|---|
| 1,715,466 A | * | 6/1929 | Miller |
| 3,415,378 A | | 12/1968 | Fukuda |
| 3,681,236 A | * | 8/1972 | Bergles |
| 3,741,393 A | | 6/1973 | Estes et al. |
| 4,268,389 A | * | 5/1981 | Rapp et al. |
| 4,325,823 A | * | 4/1982 | Graham |
| 4,608,157 A | | 8/1986 | Graves |
| 4,650,577 A | | 3/1987 | Hansel |
| 4,933,076 A | | 6/1990 | Oshima et al. |
| 5,104,542 A | * | 4/1992 | Dixon et al. |
| 5,221,470 A | | 6/1993 | McKinney |
| 5,490,935 A | | 2/1996 | Guy |
| 5,492,635 A | | 2/1996 | Ball |
| 5,549,818 A | | 8/1996 | McGrew, Jr. |
| 5,667,689 A | | 9/1997 | Graves |
| 5,879,550 A | | 3/1999 | Cox |
| 6,224,752 B1 | * | 5/2001 | Drewery |

OTHER PUBLICATIONS

Murphy Cormier Gen. Cont. Inc., Hoot Brochure (Not Dated).

* cited by examiner

Primary Examiner—Joseph W. Drodge
Assistant Examiner—Terry K. Cecil
(74) Attorney, Agent, or Firm—Phelps Dunbar, L.L.P.

(57) ABSTRACT

The Three Stage Sewage Treatment Plant is an uniquely designed three stage sewage waste water cleaning device for use in homes and other buildings which are not attached to municipal sewer systems. It employs both aerobic and anaerobic microorganisms to break down sewage, in addition to gravity separation of solids from the effluent. The cleaning process is centered around a cylindrical aerobic tank which is divided into an inner and an outer chamber by a funnel shaped clarifier. In the outer chamber of the aerobic tank, air droplines aerate the sewage, promoting the aerobic microorganisms that break down the sewage, and create turbulence. In the inner chamber, the sewage is gravity separated, such that solid particles are extracted from a cleaned effluent. The device is comprised of a pre-treatment tank, which screens out solid particles and allows for the preliminary anaerobic cleaning process, and a post-treatment tank, where the effluent is chlorinated and stored, in addition to the aerobic tank. This device makes use of an unique design that enables the use of a cylindrical aerobic tank, important for diffusion of air in the aerobic tank, in conjunction with the use of concrete as an effective building material. The design utilizes arch-shaped side tanks which strengthen the joint between the side tanks and the aerobic tank in order to allow for lesser accumulation of concrete at the joints while maintaining a strong, durable joint, thereby providing for a relatively light-weight device which is durable, non-degradable, and easily installed.

27 Claims, 4 Drawing Sheets

THREE STAGE SEWAGE TREATMENT PLANT

The present application claims the benefit of U.S. provisional patent application No. 60/143,463, which was filed on Jul. 13, 1999.

BACKGROUND OF THE INVENTION

This invention relates generally to the treatment of sewage or waste water. More particularly, this invention relates to the treatment of sewage or waste water discharged from houses and other buildings which are not connected to a municipal sewer system such that, after the sewage has passed through the Three Stage Sewage Treatment Plant (TSSTP), it has been cleaned to a level acceptable for discharge into the environment so that it will not contaminate the ground water. Thus, the TSSTP provides an alternative to septic systems for buildings constructed outside of a local municipal sewer system.

The TSSTP expands upon existing sewage treatment technology, particularly the conventional sewage treatment technology which uses aerobic microorganisms to break down sewage. One such conventional sewage treatment device is seen in U.S. Pat. No. 5,549,818. This conventional sewage treatment device consists of a cylindrical tank which encompasses a funnel-shaped clarifier. Thus, the cylindrical tank is divided into an outer chamber, between the outer wall of the tank and the clarifier, and an inner chamber, inside the clarifier. Air is introduced into the outer chamber by multiple air droplines, which are connected to an air compressor and which pump air bubbles into the sewage in the outer chamber. Sewage flows into the outer chamber where it comes in contact with the air bubbles. The introduction of air facilitates the breakdown and digestion of the sewage by aerobic microorganisms present in the sewage. The aerated sewage then proceeds into the clarifier through an opening at the bottom of the funnel-shaped clarifier. Inside the clarifier is a quiescent zone. This area of calm in the inner chamber of the device allows for settling to occur, with the solids falling back out of the clarifier and collecting on the bottom of the treatment tank. Accordingly, the waste water becomes cleaner as it progresses upward in the funnel-shaped clarifier, continuing to allow gravity to separate the solids from the water. So, by the time the sewage has progressed up through the clarifier, it has been substantially cleaned. This treated effluent exits near the top of the clarifier and is discharged.

While conventional one-stage sewage treatment devices, such as that described in U.S. Pat. No. 5,549,818, act to substantially clean sewage, such sewage may be cleaned more thoroughly and processed more effectively by combining this aerobic cleaning process with additional stages. Initially, this was done by connecting the aerobic sewage treatment device to a separate trash tank and, sometimes, to a separate pump tank. This configuration, linking separate elements together, was cumbersome and bulky. Three separate installations were required, with each separate tank then being connected together with pipes in the field to enable sewage flow between the separate tanks. This installation process was slow and, because it essentially required a custom fitting in the field, prone to error and/or expense. Furthermore, the use of three separate devices connected by pipes meant that the complete unit was spread out, requiring extensive digging in order to clear a sufficiently large area for installation. In addition to adding cost to the installation of the unit, this extensive digging was also inconvenient to the landowner because it causes widespread damage to the yard.

In an attempt to overcome several of these problems, single units encompassing multiple stages in a single device have been constructed. One example of a multi-stage sewage treatment device is seen in U.S. Pat. No. 3,741,393. This device divides a single, plastic septic tank into three sub-tanks: a trash tank, an aerobic tank (although it differs substantially from the aerobic tank seen in U.S. Pat. No. 5,549,818 because it does not employ a clarifier with air droplines), and a settling tank. The use of plastic to construct the tank, however, is problematic. Plastic is not a particularly strong material, which is problematic as the device must be buried beneath the ground, enduring substantial weight over its life. And, plastic may tend to degrade over time, raising the possibility of leakage and groundwater contamination.

Other devices have attempted to overcome these problems by building a multi-stage sewage treatment unit out of concrete, a material which is very strong under compression and which does not degrade over time. Such a device may be seen in U.S. Pat. No. 4,608,157, which has a trash tank, an aerobic tank (although it, again, differs substantially from the aerobic tank seen in U.S. Pat. No. 5,549,818 because it does not employ a clarifier with air droplines), and a settling tank. The problem with concrete, however, is that it is heavy, complicating installation, and brittle. Current concrete multi-unit sewage treatment devices, such as that seen in U.S. Pat. No. 4,608,157, make use of rectangular-shaped tanks. This is not ideal, however, when the aerobic tank employs a clarifier and air droplines (which is a superior process for cleaning sewage) since it results in "dead zones" in the corners of the tank, with the sewage in those zones receiving little, if any aeration. This is a substantial problem, since proper aeration is required in order for the aerobic microorganisms to function to break down the sewage.

Earlier attempts to solve this aeration problem have resulted in prototype designs which combine a cylindrical central aerobic tank with rectangular trash and settling tanks. Unfortunately, these designs have two serious, interrelated flaws which have kept them from being successful: these designs produce either a very heavy device that, while structurally sound (due to the accumulation of large amounts of concrete at the joint locations between the tanks), is heavy and difficult to handle; or, if the design attempts to lighten the device by eliminating some of the concrete at the joints, a device that is fragile and prone to brittle breakage along the joints between the tanks (raising serious environmental contamination concerns).

The Three Stage Sewage Treatment Plant (TSSTP) of the present invention solves all of these problems due to an innovative design that uses the shape of the tanks to shore up the joints between the tanks, preventing brittle breakage. The TSSTP typically combines three separate cleaning stages into a single sewage treatment device. The sewage first enters a pretreatment area, which screens large solids while allowing anaerobic microorganisms to begin breaking down the sewage. The sewage then proceeds into a cylindrical aerobic tank where it is thoroughly aerated as it traverses down the height of the tank and then clarified as it proceeds upward through the clarifier. Finally, the sewage enters a post-treatment tank, where it is chlorinated and stored for additional settling before discharge. This multi-step process produces a cleaner effluent. The three cleaning stages have been combined into a single unit for convenience and ease and installation. And, the device is constructed of concrete, such that it is strong and durable, providing a long operating life without any degradation. Finally, the TSSTP maintains a reasonable weight, again ensuring ease of installation (without the need for expensive lifting equipment), while also overcoming the longstanding problem of brittle breakage along the joints between the tanks with it uniquely shaped design.

The central aerobic tank is cylindrical, such that it has a circular cross-section that eliminates "dead zones." The side tanks have an arch-shaped horizontal cross-section (when viewed from above) which provides sufficient architectural strength to prevent any brittle breakage. Thus, the TSSTP represents an improved design which overcomes existing problems in the multi-stage sewage treatment field to produce a better product. This novel design can be used to construct a concrete device with one or more side tanks of the designated shape connected to a cylindrical aerobic tank, In the TSSTP, two side tanks are used in conjunction with the a cylindrical aerobic tank in order to employ a more thorough, three stage cleaning process.

SUMMARY OF THE INVENTION

The TSSTP is a single, unitary device utilizing a three stage procedure for treating sewage. The TSSTP is comprised of a pre-treatment tank, which holds the sewage for a time while allowing the anaerobic microorganisms in the sewage to begin initially breaking down the sewage, an aerobic tank, in which the sewage is aerated to allow aerobic microorganisms to further break down the sewage and then clarified as the heavier particles separate from the effluent, and a post-treatment tank, which chlorinates the effluent before discharge. All three tanks are formed as a single, whole unit (using a concrete mold which incorporates all three tanks, creating a continuous, one-piece concrete unit with three separate tanks without the need to join separate tanks together), allowing for convenient installation.

Raw sewage enters the pre-treatment tank first to allow the anaerobic microorganisms in the sewage to begin the initial processing of the sewage. The pre-treatment tank has side walls and a bottom, and the top is sealed by a separate cover. Anaerobic microorganisms feed on the sewage, breaking it down in the process. The pre-treatment tank also serves to screen out objects which would hamper the functioning of the aerobic tank. As the pre-treatment tank continues to accept raw sewage, sewage is forced out of the pre-treatment tank through the outlet conduit. Near the top of the pre-treatment tank is a overflow conduit which leads to the aerobic tank. Gravity will segregate the sewage in the pre-treatment tank, such that light solids will float upon the surface while heavy solids will settle to the bottom. In between these two zones is a zone of effluent which is relatively free of particles. The overflow conduit drains sewage from this particle-free zone beneath the surface level, thereby screening out floating solids and heavy solids. An effluent filter, which is not required, may cover the opening of the overflow conduit to further prevent large particles from passing through the overflow conduit. In this way, the overflow conduit traps the large solid contaminants so that they do not enter the aerobic tank and clog the device. After the raw sewage has been gravity separated and processed by anaerobic microorganisms, it flows into the aerobic tank for the next stage of the treatment process.

The aerobic tank is a cylindrical vessel with sidewalls and a bottom, and the top is sealed by a separate cover. The tank encompasses a funnel-shaped clarifier. The clarifier is wide near the top of the aerobic tank and narrows towards the bottom of the tank, and there is an opening in the bottom of the clarifier. There are many methods which could be used to hold the clarifier in place inside the aerobic tank. The TSSTP uses a clarifier design with a lip that overhangs the sidewalls of the aerobic tank. Thus, the clarifier actually hangs down from the top of the sidewalls. The lip of the clarifier is held firmly in place between the top of the aerobic tank sidewalls and the cover for the aerobic tank. The funnel-shaped main body of the clarifier is offset slightly down from the top of the tank, so that there is a gap between the top of the clarifier and the top of the aerobic tank. This offset provides clearance for the air feed conduit. The clarifier hangs down inside the vessel, not reaching down to the bottom of the aerobic tank but leaving an area of clearance between the bottom of the clarifier and the bottom of the aerobic tank. Thus, the aerobic tank is divided into two chambers by the clarifier. Between the outer sidewalls of the aerobic tank and the clarifier is the outer chamber, where aeration of the sewage occurs, while the volume inside the clarifier is the inner chamber of the aerobic tank, where solid particles are gravity separated from the effluent.

Running down into the outer chamber of the aerobic tank from the top of the aerobic tank are droplines. These droplines are typically distributed in the outer chamber such that they provide for aeration throughout the upper part of the outer chamber, above the bottom of the clarifier. This placement of the droplines in the cylindrical aerobic tank ensures that there are no "dead zones." These droplines are conduits which are typically capped at the bottom end and which have small holes for emitting air. The top end of these droplines are connected to an air feed conduit which directs air from the compressor, so that the droplines will emit air bubbles into the outer chamber, continuously aerating the sewage passing through the outer chamber of the aerobic tank. The inner chamber, located inside the clarifier, is screened from the aerating effect of the droplines by the walls of the clarifier, so this inner chamber is a non-turbulent, quiescent zone. Near the top of the inner chamber with its opening located inside the clarifier is an outlet drain leading to the post-treatment tank. Typically, the outlet drain is comprised of an outlet conduit, extending from the clarifier of the aerobic tank to the post-treatment tank, and a T-Baffle, which controls the flow of effluent into the outlet conduit. The T-Baffle is comprised of two T-joints. The first T-joint connects to the outlet conduit and extend upwards and downwards from the outlet conduit. The second T-joint connects to the bottom of the first T-joint, so that its two openings extend out perpendicularly from the openings of the first Tjoint. The uppermost opening of the first T-joint extends above the fluid level within the clarifier, acting as a vent for the T-Baffle. Both of the openings for the second T-joint are beneath the fluid level within the clarifier. Thus, the effluent enters the T-Baffle through the two lower openings and then flows into the outlet conduit, out of the clarifier of the aerobic tank and into the post-treatment tank. Because a film of scum can form atop the liquid in the aerobic tank, the T-Baffle acts to drain effluent from beneath the surface of the fluid to provide for a cleaner effluent discharge from the aerobic tank.

The sewage, which has already been initially processed by anaerobic microorganisms, enters the aerobic tank through the overflow conduit located near the top of the aerobic tank. The sewage moves into the outer chamber of the aerobic tank and descends downward through the outer chamber as additional sewage enters the aerobic tank through the overflow conduit. As the sewage descends, it passes through the air bubbles emitted from the drop lines. This excites the sewage, causing turbulent motion, as it aerates the sewage. Injecting air into the sewage activates and stimulates the aerobic microorganisms in the sewage. This causes the aerobic microorganisms to multiply and increases the amount of sewage that they digest. This aerobic process eliminates sewage contaminants to a great extent, cleaning the sewage. After passing through the aeration zone of the outer chamber of the aeration tank, the sewage enters a relatively calm zone below the air holes in the drop lines. Here, settling begins to occur, with heavier solids falling towards the bottom of the aerobic tank. The sewage in the quiescent zone is displaced upwards and through the opening in the bottom of the clarifier and into the inner chamber of the aerobic tank as more sewage enters the outer chamber of the aerobic tank. The sewage in the inner chamber is in a relatively calm state, and so contaminants, acted upon by gravity, will continue to settle downwards. In this way, the clarifier acts to screen out solid contaminants from the effluent. This continuous process results in a very clean effluent at the top of the inner chamber, where it is drained off by the T-Baffle and flows out of the aerobic tank through the outlet conduit and into the post-treatment tank.

While the post-treatment tank and the pre-treatment tank may be located anywhere around the aerobic tank, the post-treatment tank is generally located on the opposite side of the aerobic tank from the pre-treatment tank. It has sidewalls and a bottom, and the top is sealed with a separate cover. The outlet conduit enters the post-treatment tank near the top of the tank. There, it may connect to a chlorinator, through which the effluent passes into the storage space of the post-treatment tank. When passing through the chlorinator, the effluent is chlorinated, generally by flowing across a chlorine tablet. The cleaned effluent is held in the post-treatment tank, allowing further settling and diffusion of the chlorine throughout the effluent. When the effluent rises to a certain level, it activates a float switch, triggering a pump, which can be either internal or external, discharging the cleaned effluent.

The TSSTP is formed such that the pre-treatment tank and the post-treatment tank connect to the aerobic tank, creating a single unit which performs the three stage cleaning process. The top of the three tanks are capped to make the TSSTP a closed system. While several individual covers may be used, it is preferable to use a single cover for the entire TSSTP device, as this provides additional strength and rigidity to the device. This single cover needs to be formed so that it seals each tank individually, so that there can be no sewage gas transfer between the tanks. In addition, chlorine cannot be allowed to flow from the post-treatment tank to the aerobic tank, as that would kill the aerobic microorganisms which are crucial to the cleaning process. The portion of the cover for each tank may have a service hatch for maintenance. Generally, there is a riser extending from the top of the aerobic tank, allowing for inspection and cleaning of the aerobic tank. Also, there is generally a larger high riser on the post-treatment tank, large enough to allow for installation of an internal pump in the post-treatment tank, with a loose fitting cap that allows for venting of air from the system. It is also through this riser that an external pump would operate.

The TSSTP is typically constructed of wire reenforced concrete, which is both strong under compression and non-degradable To reduce the weight of this concrete device as much as possible while maintaining strength and durability, the TSSTP employs a uniquely shaped design. The central aerobic tank is cylindrical, such that in plan view it is circular in cross-section. Both the pretreatment tank and the post-treatment tank have an arch-shaped (or crescent-shaped) plan view horizontal cross-section (which extends along the height of the cylindrical aerobic tank to form a three dimensional tank), and are connected to the aerobic tank such that the two approximately parallel sidewalls of each tank, which extend from the semi-circular arc of the cross-section, attach tangentially to the outer cylindrical walls of the aerobic tank (such that the outer wall of the aerobic tank forms the final wall closing the tank). Thus, both the pre-treatment tank and the post-treatment tank each have a semi-circular wall (farthest away from the aerobic tank), two approximately parallel side walls, and a connecting wall (which is shared with the aerobic tank). The semi-circles which form the curved portion of the arched cross-sections of the pre-treatment and post-treatment tanks have approximately the same radius as the circular cross-section of the cylindrical aerobic tank. The thickness of the walls for all of the tanks may be identical. All of these elements combine to form a strong unitary structure with a smooth, continuous outer wall of uniform thickness (with the outer wall of the TSSTP shaped essentially like a racetrack in the most typical formation, which has the pre-treatment tank attached to the aerobic tank directly opposite from the post-treatment tank, which is attached to the other side of the aerobic tank) that uses the circular elements of the design to take advantage of the strength of concrete in compression. The inherent strength of this shape eliminates the need for excess concrete buildup at the joints (thereby reducing the weight of the device, and making it much more practicable to install), while providing for strong joints linking the pre-treatment tank and the post-treatment tank to the central aerobic tank. And, the smooth profile of the device also reduces the possibility of damage to the device during installation.

Generally, the tanks are sized so that they do not have to be pumped clean very often, on average requiring cleaning once a decade. In addition, the sizes of the tanks are dependant upon the expected amount of sewage generated by the buildings they service on a daily basis. The aerobic tank must also be sized so that the sewage remains in it long enough for the aerobic microorganisms to effectively process the sewage. The TSSTP is typically installed below ground, buried in the yard of a residence, so its compact design simplifies installation and minimizes the amount of damage to the yard. And, of course, the device must be able to withstand the weight of the soil under which the device is buried.

It is an object of this invention to clean sewage in preparation for discharge. In doing so, this invention captures large solids in the pre-treatment tank, uses both anaerobic and aerobic processes to break down the sewage, separates the contaminants from the sewage water, and chlorinates the effluent. It is still another object of this invention for it to be easy-to-install, relatively lightweight, strong, and durable, requiring very little maintenance. It is yet another object of this invention to provide a three stage sewage cleaning process in a single, compact concrete unit. It is yet another object of this invention to utilize a design shape which allows for a structurally sound unitary device with a cylindrical aerobic tank and connected side tanks. It is yet another object of this invention to discharge water which meets or exceeds state and federal water quality requirements. It is yet another object of this invention to allow for inspection of the tanks and to allow for cleaning and maintenance of the invention.

BRIEF DESCRIPTION OF DRAWINGS

Reference will be made to the drawings where like parts are designated by like numerals and wherein.

DETAILED DESCRIPTION OF PREFERRED EMBODIMENT

Figure 1:
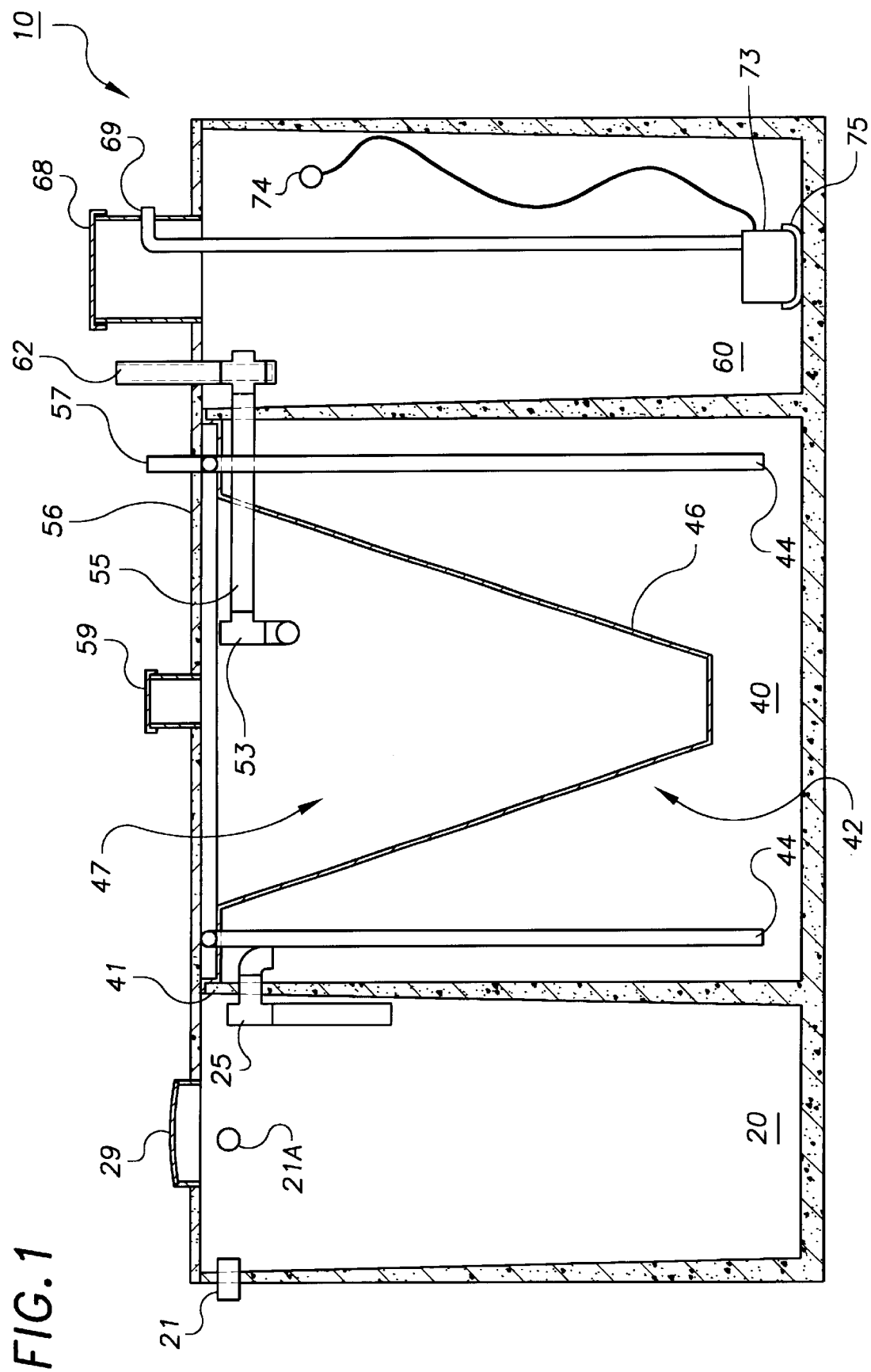
FIG. 1 is an elemental representation of a side view of the TSSTP.
Figure 2:
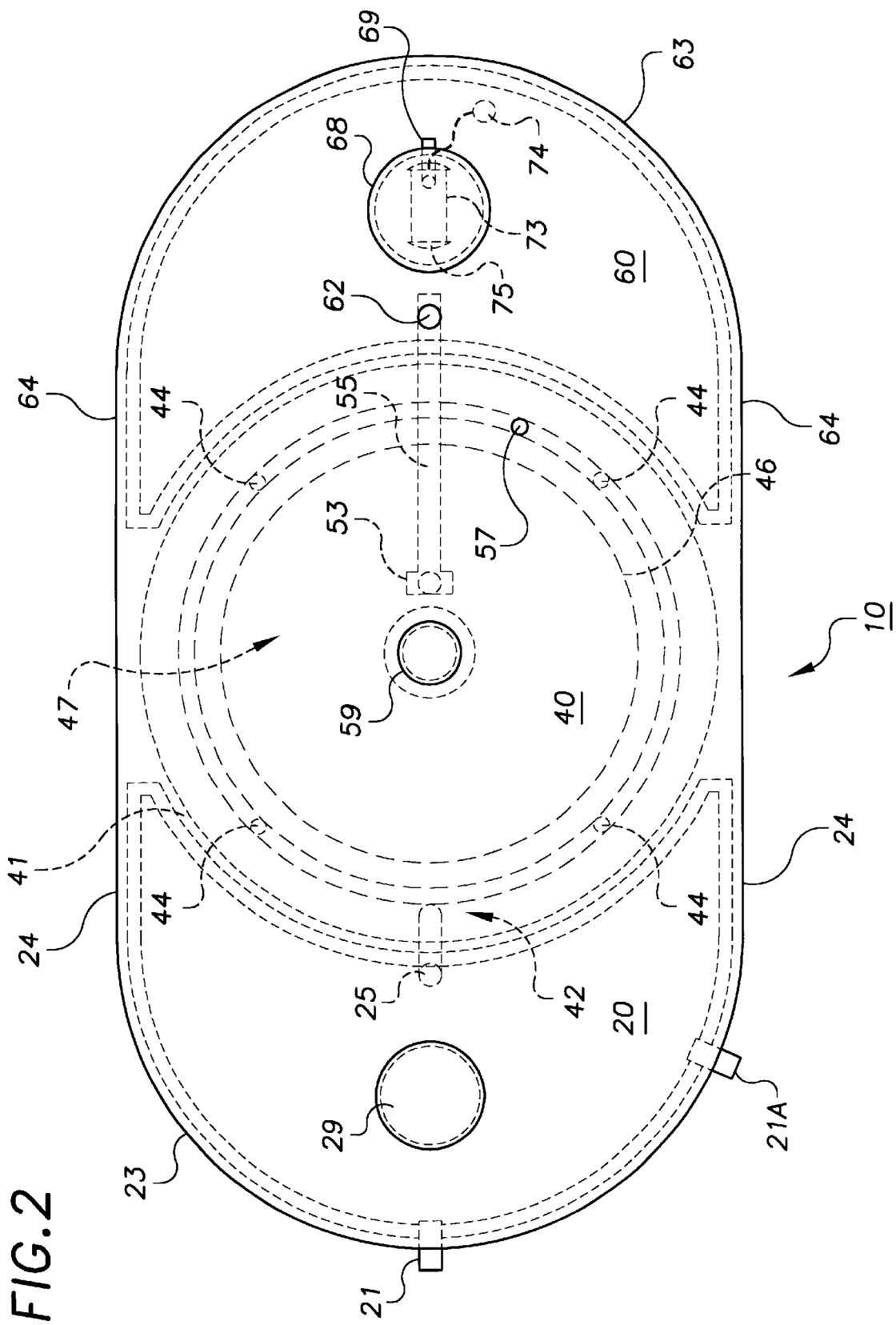
FIG. 2 is an overhead view of the TSSTP.
Figure 5:
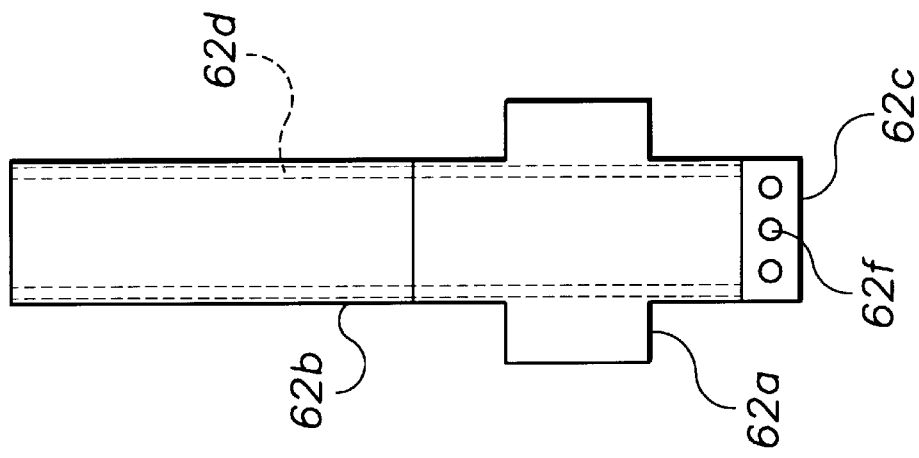
FIG. 5 is a side view of the chlorinator 62 in the TSSTP.

Referring now to the drawings in more detail, the preferred embodiment of the TSSTP is generally designated by the numeral 10.

The TSSTP is comprised of three tanks which are connected together as a single unit. In the preferred embodiment, the device is framed as a continuous, one-piece unit with three integrated tanks. The central tank of the three, which is generally the largest, is the aerobic tank 40, which is cylindrical with a closed bottom. Also, although the size of the aerobic tank 40 can vary depending upon the amount of sewage that the TSSTP will likely receive, the aerobic tank 40 generally ranges from 800 to 1400 gallons, with the preferred embodiment holding 1006 gallons. The other two tanks 20 and 60 are generally smaller than the aerobic tank 40. The tanks 20 and 60 typically range in size from 300 to 1000 gallons, and in the preferred embodiment the pretreatment tank 20 holds 400 gallons while the post-treatment tank 60 holds 750 gallons.

The most critical design feature of the TSSTP is the shape of the side tanks (such as the pretreatment tank 20 and the post-treatment tank 60) connected to the cylindrical aerobic tank 40. The side tanks have an arch-shaped (or crescent-shaped) plan view horizontal cross-section (which extends along the height of the cylindrical aerobic tank 40 to form a three dimensional tank), and are connected to the aerobic tank such that the two approximately parallel sidewalls of each tank 20 and 60, which extend from the semi-circular arc of the cross-section, attach tangentially to the outer cylindrical walls of the aerobic tank 40 (such that the outer wall of the aerobic tank 40 forms the final wall closing the tank). The side tanks have a closed bottom such that they form vessels or tanks for containing sewage. The semi-circle which forms the curved portion of the arched cross-section of the side tank has approximately the same radius as the circular cross-section of the cylindrical aerobic tank 40. Also, in the preferred embodiment, the cross-section thickness of the walls for all of the tanks is identical.

In the preferred embodiment, which uses two side tanks, a pre-treatment tank 20 and a post-treatment tank 60, in order to employ a more thorough three stage sewage cleaning process, the pretreatment tank 20 is connected to the aerobic tank 40 on the opposite side of the aerobic tank 40 across from the post-treatment tank 60. The pre-treatment tank 20 is arch-shaped, such that the end of pre-treatment tank 20 farthest away from the aerobic tank 40 is formed as a semi-circular wall 23 curving towards the aerobic tank 40 and having approximately the same radius of curve as the radius of the aerobic tank 40. The sidewalls 24 of pre-treatment tank 20 are two approximately parallel walls tangentially connecting the open ends of the semi-circular wall 23 to the aerobic tank 40. Thus the pre-treatment tank 20 is bounded by the semi-circular wall 23, the two approximately parallel sidewalls 24, and a portion of the outside sidewall of aerobic tank 40 (that portion between the two parallel sidewalls 24). And, the pre-treatment tank 20 has a closed bottom that connects to the closed bottom of the aerobic tank 40.

The post-treatment tank 60 is similarly arch-shaped, such that the end of the post-treatment tank 60 farthest away from the aerobic tank 40 is formed as a semi-circular wall 63 curving towards the aerobic tank 40 and having approximately the same radius of curve as the radius of the aerobic tank 40. The sidewalls 64 of the post-treatment tank 60 are two approximately parallel walls tangentially connecting the open ends of the semi-circular wall 63 to the aerobic tank 40. Thus the post-treatment tank 60 is bounded by the semi-circular wall 63, the two approximately parallel sidewalls 64, and a portion of the outside sidewall of aerobic tank 40 (that portion between the two parallel sidewalls 64). And, the post-treatment tank 60 has a closed bottom that connects to the closed bottom of the aerobic tank 40.

All of these design elements combine to form a strong unitary structure with a smooth, continuous outer wall of uniform cross-section thickness (with the outer wall of the TSSTP shaped essentially like a racetrack in the most typical formation) that uses the circular elements of the design to take advantage of material's strength in compression. The inherent strength of this shape eliminates the need for excess structural material, such as concrete buildup, at the joints (thereby reducing the weight of the device, and making it much more practicable to install), while providing for strong joints linking the pre-treatment tank 20 and the post-treatment tank 60 to the central cylindrical aerobic tank 40. And, the smooth profile offered by this design reduces the possibility of damage to the device during installation.

Although the aerobic tank 40, the pre-treatment tank 20, and the post-treatment tank 60 can be made of any non-porous, non-toxic, solid material, in the preferred embodiment of the TSSTP all of the tanks 20, 40, 60 are formed of wire reinforced concrete. This material selection provides for a relatively inexpensive device which is strong and non-degradable, and it takes full advantage of the structural design, which emphasizes the compression strength of the material. In the preferred embodiment, the walls and bottoms of tanks 20, 40, and 60 are reinforced with 6×6 10/10 Welded Wire Fabric, located approximately in the center of the thickness of the walls and bottoms.

In the preferred embodiment, the aerobic tank has a radius of 33 inches. Furthermore, in the preferred embodiment, while the wall thickness is uniform for each horizontal cross-section at a particular height, the walls of pre-treatment tank 20 vary in thickness from approximately 3 inches in thickness at the top of the pre-treatment tank 20 to approximately 4.5 inches in thickness at the bottom of the pre-treatment tank 20; the walls of post-treatment tank 60 also vary in thickness from approximately 3 inches in thickness at the top of the post-treatment tank 60 to approximately 4.5 inches in thickness at the bottom of the post-treatment tank 60. This slight variance in the thickness of the walls of tanks 20 and 60 along their height facilitates extraction of the TSSTP 10 from its concrete mold.

Each of the tanks in the TSSTP must be covered. The cover can be an integrated part of the tank, but generally the cover is a separate, distinct component to simplify both construction and maintenance. The top of the tanks can be sealed by having a separate cover for the pre-treatment tank 20, for the aerobic tank 40, and for the post-treatment tank 60, or a single cover can seal all three at once. In the preferred embodiment, a single cover 56 is used to cap the pre-treatment tank 20, the aerobic tank 40, and the post-treatment tank 60. The use of a single cover 56 provides additional rigidity and strength, holding the TSSTP together as a unitary whole. The cover 56 must seal each tank from the others to prevent any flow of gases between the three stages of the TSSTP. Consequently, the cover 56 is applied atop the tanks with a sealant and/or an adhesive. In the preferred embodiment, the cover 56 is formed of wire reinforced concrete and is sealed onto the TSSTP tanks 20,40, and 60 using an asphalt adhesive. Also, in the preferred embodiment, the cover 56 is reinforced with 6×6 6/6 Welded Wire Fabric, located in approximately the center of the cross-section of the cover 56. And, in the preferred embodiment, the cover 56 is formed with openings for risers and inspection ports for the tanks.

Figure 3:
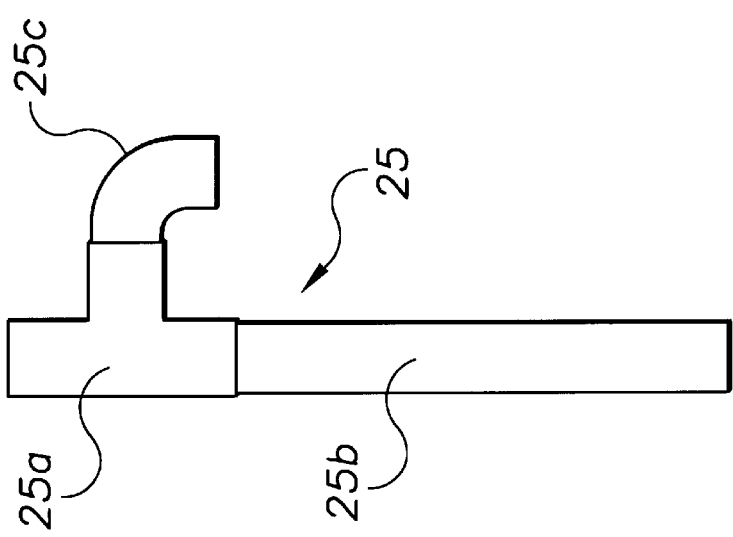
FIG. 3 is a side view of the overflow conduit 25 in the TSSTP.

The pre-treatment tank 20 has an inlet port 21 in its sidewall where the sewage flows into the TSSTP. The preferred embodiment also contains an alternate inlet port 21A at a different location for convenience during installation. Generally, the inlet port 21 is located near the top of the pretreatment tank 20 away from the connection to the aerobic tank 40. Located near the top of the pretreatment tank 20 on the wall of the pre-treatment tank 20 adjacent to the aerobic tank 40 is an overflow conduit 25 which penetrates the wall between the pre-treatment tank 20 and the aerobic tank 40 and allows for sewage to flow from the pre-treatment tank 20 into the aerobic tank 40. The purpose of the overflow conduit 25 is to transport sewage, which has been in the pre-treatment tank 20 for a sufficient duration of time to allow the anaerobic microorganisms to begin processing the sewage, from the pre-treatment tank 20 to the aerobic tank 40 for further processing. The overflow conduit 25 draws effluent from beneath the surface, in the relatively particle-free zone of effluent between the surface, where light particles float, and the bottom, where the heavy particles settle. An effluent filter can cover the overflow conduit 25 to further reduce the amount of solid contaminants entering the aerobic tank. In the preferred embodiment, the overflow conduit 25 is comprised of a T-joint 25a, a length of straight conduit 25b, and a directional bend 25c (see FIG. 3). One branch of the T-joint 25a passes through the common wall of the pre-treatment tank 20 and the aerobic tank 40. The remaining branches of the T-joint 25a project up towards the top of the pre-treatment tank 20 and down towards the bottom of the pre-treatment tank 20. The upper branch of the T-joint 25a is open and extends above the sewage surface level to act as a vent. The straight conduit 25b is rigidly attached to the bottom branch of the T-joint 25a. The straight conduit 25b extends down a short distance beneath the sewage fluid level in the pre-treatment tank 20 so that it takes sewage from near the surface but not from the surface of the sewage itself, where there may be material floating. On the other side of the common wall between the pre-treatment tank 20 and the aerobic tank 40, the directional bend 25c of the overflow conduit 25 is rigidly attached to the T-section 25a so that it directs the sewage flow downward into the aerobic tank 40.

Figure 6:
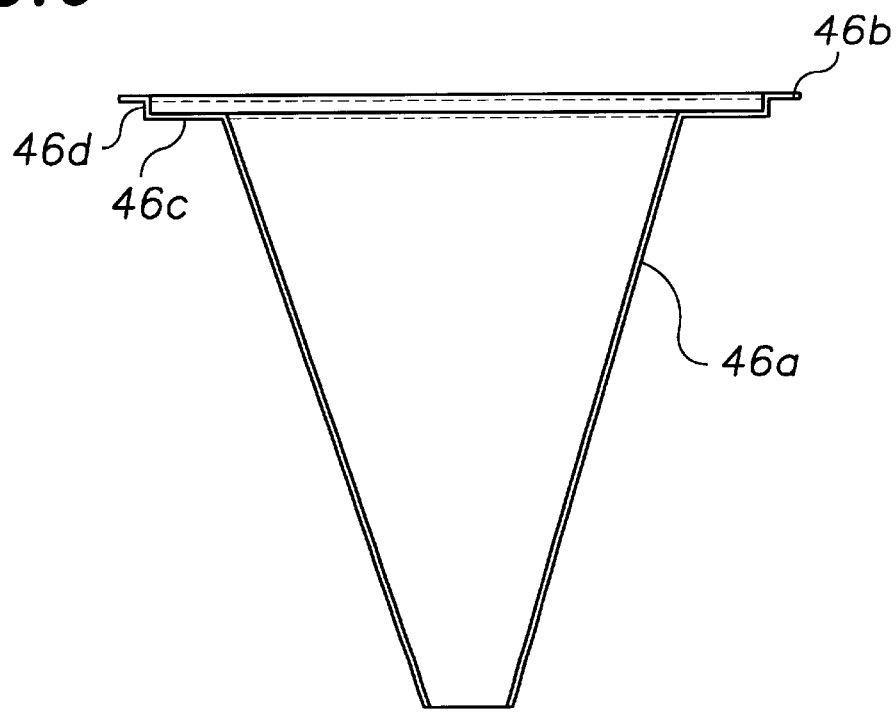
FIG. 6 is a cut-away side view of the clarifier 46.
Figure 7:
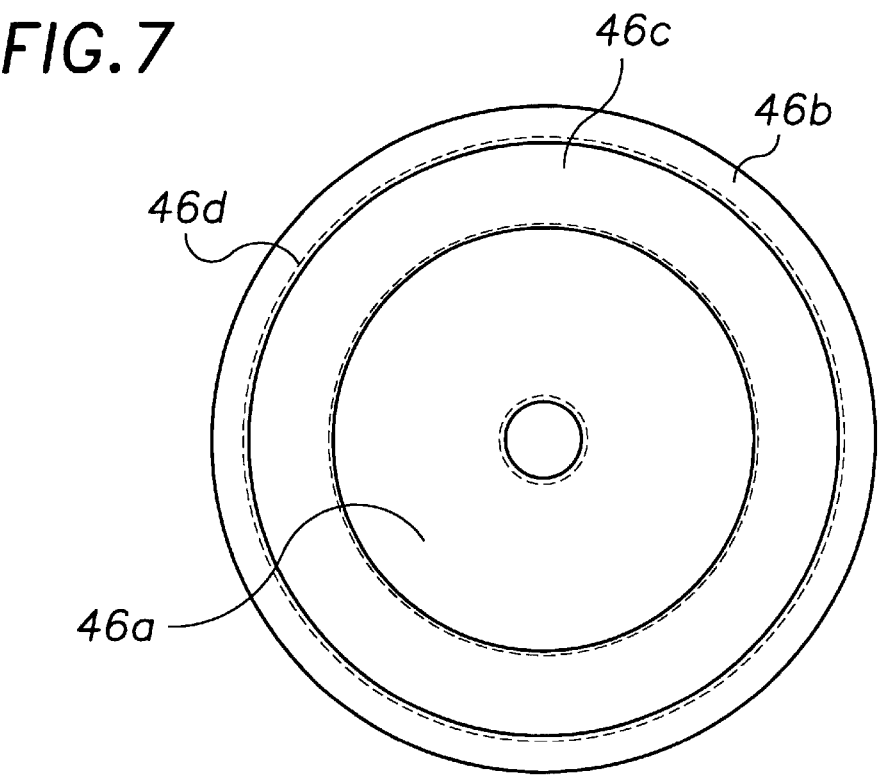
FIG. 7 is an overhead view of the clarifier 46.

Within the aerobic tank 40 of the TSSTP, is a funnel-shaped clarifier 46. The clarifier 46 is wide near the top of the aerobic tank 40 and narrow near the bottom of the aerobic tank 40, with a hole in the bottom of the clarifier 46. The preferred embodiment uses a clarifier 46 design with a lip 46b that overhangs the sidewalls 41 of the aerobic tank 40 (see FIG. 6). Thus, the clarifier 46 actually hangs down from the top of the sidewalls 41. The lip 46b of the clarifier is held firmly in place between the top of the aerobic tank sidewalls 41 and the cover 56 for the aerobic tank. The funnel-shaped clarifier main body 46a is offset slightly down from the top of the tank, so that there is a gap between the top of the clarifier main body 46a and the top of the aerobic tank 40. This offset 46d provides clearance for the air feed conduit 57. Also, in the preferred embodiment, the clarifier main body 46a is set slightly in radially from the sidewalls 41 of the aerobic tank 40, providing a rim 46c on which the air feed conduit 57 may lie. The clarifier 46 hangs downward in the aerobic tank 40, but does not extend all the way to the bottom of the aerobic tank 40; instead there is a gap between the bottom of the clarifier 46, which is the small end of the funnel, and the bottom of the aerobic tank 40. Thus, the clarifier 46 divides the aerobic tank 40 into two chambers. The outer chamber 42 of the aerobic tank 40 is located between the sidewall of the aerobic tank 40 and the clarifier 46. The inner chamber 47, is located inside the funnel-shaped clarifier 46. Located in the outer chamber 42 of the aerobic tank, are one or more air droplines 44 which hang down into the sewage from the top of the aerobic tank 40. These droplines 44 are conduits, generally capped at the bottom ends, with holes for emitting air bubbles. In the preferred embodiment, the droplines 44 are cylindrical conduits. The top ends of the plurality of droplines 44 are connected to an air feed conduit 57 which leads to an external air compressor. Thus, when the air compressor is operating, air flows through the air feed conduit 57, into the droplines 44, and bubbles out into the sewage in the outer chamber 42 of the aerobic tank 40. For best results, the droplines 44 should not emit air bubbles beneath the level of the bottom of the clarifier 46. While this may be accomplished by restricting the length of the droplines 44 so that they do not extend down beneath the bottom of the clarifier 46, the preferred embodiment uses droplines 44 which extend down past the bottom of the clarifier 46 but which only have holes in the area above the bottom of the clarifier 46. There should be enough droplines to adequately aerate the sewage in the upper part of the outer chamber 42, with two through eight generally required. The preferred embodiment uses four such droplines 44 which are evenly spaced in the area of the outer chamber 42 to ensure complete aeration of the sewage in the outer chamber 42.

Figure 4:
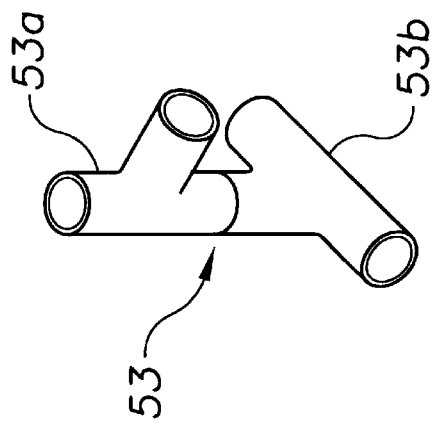
FIG. 4 is a perspective view of the T-Baffle 53 in the TSSTP

Located near the center of the inner chamber 47 near the top of the aerobic tank 40 is the T-Baffle 53. The T-Baffle 53 functions to draw cleaned effluent from near the top of the sewage surface level in the inner chamber 47 and to transport it through the outlet conduit 55 and into the post-treatment tank 60. The T-Baffle 53 is comprised of two T-joints 53a and 53b rigidly linked together (see FIG. 4). The lower T-joint 53b is located near the surface level, beneath the cleaned effluent so that cleaned effluent will enter through the two openings in the T-joint 53b. This lower T-joint 53b is rigidly attached to a branch of the upper T-joint 53a. One of the other branches of upper T-joint 53a extends up out of the effluent and acts as a vent. The third branch of the upper Tjoint 53a is rigidly attached to the outlet conduit 55 which extends outward radially from the central location of the T-Baffle 53, through the outer sidewall joining the aerobic tank 40 to the post-treatment tank 60, and into the post-treatment tank 60. Thus, the T-Baffle 53 and connected outlet conduit 55 transport effluent from the inner chamber 47 of the aerobic tank 40 into the post-treatment tank 60.

In the post-treatment tank 60, the outlet conduit 55 from the aerobic tank 40 is rigidly attached to a chlorinator 62. The purpose of the chlorinator 62 is to distribute chlorine into the effluent. In the preferred embodiment, the chlorinator 62 distributes chlorine by physical contact of the effluent with chlorine tablets. The chlorinator 62 is comprised of a cross 62a, an external feeding conduit 62b, a cap 62c with holes drilled in it, and a tablet droptube 62d. One branch of the cross 62a is rigidly joined to the outlet conduit 55 from the aerobic tank 40, and another extends outward horizontally into the post-treatment tank 60. The remaining branches of the cross 62a extend in the vertical plane, one branch extending upwards while the other extends downwards. To the upper branch of the cross 62a is connected an external feeding conduit 62b which extends upwards out of the post-treatment tank 60. It is through this external feeding conduit 62b that the chlorine tablets are administered. Rigidly attached to the lower branch of the cross 62a is a cap 62c. The cap 62c would act to prevent the flow of effluent into the post-treatment tank 60 except that the cap 62c has slots in it which allow for the effluent to pass through the cap 62c and into the post-treatment tank 60. The chlorine tablets are loaded into the chlorine droptube 62d, which is a straight conduit that has a small enough diameter to fit into the external feeding conduit 62b. The chlorine droptube 62d is then placed in the external feeding conduit 62c, loading the chlorine into the chlorinator 62. The chlorine droptube 62d has holes in it to allow effluent to pass through the sidewall of the chlorine droptube 62d, making contact with the chlorine tablet before exiting out the cap 62c and into the storage space of the post-treatment tank 60.

In the preferred embodiment, the single cover 56 which acts to seal all three tanks of the TSSTP has openings for various risers and hatches built into it. Over the pre-treatment tank 20, the cover 56 may have a hatch 29 which allows for maintenance and cleaning of the pre-treatment tank 20. Over the aerobic tank 40, an inspection riser 59 may extend up above ground level Also, there may be four hatches over the air droplines 44 in the aerobic tank 40 to allow for inspection of the aeration equipment. Over the post-treatment tank 60, a pump connection riser 68 may extend up above ground level. This pump connection riser 68 has a loose fitting cover for venting air and gases out of the TSSTP. The pump connection riser 68 is sized to allow for installation and maintenance of an internal pump 73. Preferably, a float switch 74 in the post-treatment tank 60 activates an internal pump 73 when the effluent in the post-treatment tank reaches a certain level. In the case of an internal pump 73, a pump seat 75 can be rigidly attached to the bottom of the post-treatment tank 60 to minimize pump movement and stress on the pump line. The effluent is generally pumped out of the pump connection riser 68 beneath the ground through an outlet port drilled in the pump connection riser 68 at the time of installation.

The invention described above employs a three stage procedure for cleaning raw sewage. The raw sewage enters the TSSTP pre-treatment tank 20 through the inlet port 21, which has a sealant around it to prevent any leakage. The sewage is held in the pre-treatment tank 20, allowing anaerobic microorganisms to begin breaking down the sewage. The size of the pre-treatment tank 20 is selected taking into account the typical amount of sewage which will be generated so that the anaerobic microorganisms will have sufficient time to process the sewage. As more sewage enters the pre-treatment tank 20 through the inlet port 21, the treated sewage is displaced upwards in the pre-treatment tank 20. Some of this rising sewage enters the overflow conduit 25. By design, the overflow conduit 25 takes sewage from beneath the sewage surface level, thereby eliminating any contaminants which float upon the surface. In addition, an effluent filter may cover the opening of the overflow conduit 25 to prevent smaller solid contaminants from passing into the aerobic tank 40. In this way, the pre-treatment tank captures large solid contaminants before they can enter the aerobic tank 40, where they could interfere with the sewage treatment process.

The sewage flows through the overflow conduit 25 into the outer chamber 42 of the aerobic tank 40. A sealant around the area in which the overflow conduit 25 passes through the sidewall of the pre-treatment tank 20 prevents any leakage between tanks. As more sewage enters the aerobic tank 40 through the overflow conduit 25, sewage is displaced downward in the outer chamber 42 and passes through the air bubbles emitted from the droplines 44. These air bubbles aerate the sewage, stimulating the aerobic microorganisms so that the aerobic processing of the sewage is greatly enhanced. The turbulence caused by the air bubbles also acts to break down larger solid particles in the sewage so that the aerobic microorganisms can acts upon the sewage more effectively. As the sewage continues to descend in the outer chamber 42, the sewage exits this aeration zone where the air bubbles are emitted by the droplines 44 and enters a quiescent zone near the bottom of the aerobic tank 40. In this quiescent zone, the solid contaminants suspended in the effluent begin to fall towards the bottom of the aerobic tank 40 under the influence of gravity. As more sewage enters the outer chamber 42 from the overflow conduit 25, the aerated sewage in the quiescent zone near the bottom of the aerobic tank 40 is pushed up into the inner chamber 47 inside the clarifier 46. The inner chamber 47 is protected by the walls of the clarifier 46 from the stirring effect of the air bubbles emitted from the droplines 44 in the outer chamber 42, so the inner chamber 47 is a zone of relative calm. As the sewage continues to rise up through the inner chamber 47, the force of gravity continues to pull down the heavier solid contaminants. Thus, the inner chamber 47 acts as a gravity separator, continually segregating the contaminants from the effluent, so that by the time the treated sewage reaches the top of the inner chamber 47, the effluent has been substantially cleaned. Again, the size of the outer chamber 42 and the inner chamber 47 of the aerobic tank 40 are selected based upon the typical amounts of sewage to be processed so that each chamber has sufficient time to perform its cleaning function.

As the treated effluent nears the top of the inner chamber 47, it enters the two bottom openings in the T-Baffle 53. The effluent then flows through the outlet conduit 55, passing out of the inner chamber 47, through the clarifier 46, through the outer chamber 42, through the sidewall of the aerobic tank 40 where it is adjacent to the post-treatment tank 60, and into the post-treatment tank 60. At the point where the outlet conduit 55 passes through the clarifier 46 and the side wall of the aerobic tank 40, a sealant ensures that there is no leakage. In the post-treatment tank 60, the outlet conduit 55 rigidly connects to the chlorinator 62. Thus, the effluent flows into the cross 62a, passes through holes in the chlorine droptube 62d to flow across a chlorine tablet, and then flows down through the holes in the cap 62c to exit the chlorinator 62, chlorinating the effluent before it enters the storage space in the post-treatment tank 60. In the preferred embodiment, the chlorinator 62 uses chlorine tablets designed to ensure that the chlorine content in the effluent passing across it will be at least 1 ppm. And, in the preferred embodiment, the treated effluent is stored in the post-treatment tank 60 until the level of effluent rises high enough to activate a float switch 74 on the internal pump 73. At that point, the internal pump 73 activates and pumps the treated effluent out of the post-treatment tank 60 through the outlet port 69, discharging the now cleaned effluent.

As stated above, the preferred embodiment uses wire reinforced concrete for the three tanks 20, 40, 60, and for the cover 56. This material selection allows the TSSTP to be strong, durable, and relatively inexpensive. The clarifier, pipes, conduits, and T-joints in the preferred embodiment can also be made of any non-porous, non-toxic, solid material, but the preferred embodiment uses commercially available PVC components and a clarifier made of fibreglass since they are durable and light-weight and since their ready availability simplifies the manufacturing process. In addition, since each tank needs to be sealed to prevent transfer of liquids or gases between them and to prevent leakage of untreated sewage out of the TSSTP, sealant material is used wherever a conduit, pipe, or port passes through a separating wall. Generally, the tanks are sized appropriately depending on the expected sewage production rate of the buildings serviced by the TSSTP, with the size of the aerobic tank 40 being most critical to the sewage cleaning process since the aerobic microorganisms must be given sufficient time to process the sewage. In the preferred embodiment, the aerobic tank 40 holds approximately 1006 gallons, while the pre-treatment tank 20 holds approximately 400 gallons and the post-treatment tank 60 holds approximately 750 gallons.

In the aerobic tank 40, the size of the gap between the opening in the bottom of the clarifier 46 and the bottom of the aerobic tank 40 should be big enough to allow for a good flow of sewage from the outer chamber 42 of the aerobic tank 40 into the inner chamber 47. In the preferred embodiment, the gap is approximately 10 inches. In addition, in the preferred embodiment the offset from the top of the aerobic tank 40 to the top of the clarifier main body 46a is approximately 3 inches. Also, the clarifier rim 46c in the preferred embodiment is approximately 9 inches. Finally, in the preferred embodiment, the clarifier main body 46a has a bottom opening with a diameter of 9 inches and an upper opening with a diameter of 48 inches.

Although the size, number, and distribution of air holes in the air droplines 44 can vary, the air holes should be as small as possible without clogging regularly in operation, since this will allow for good air diffusion into the sewage while allowing the TSSTP to operate durably. In the preferred embodiment the holes are 5/64th of an inch. Each dropline 44 in the preferred embodiment has three vertical columns of holes spaced 3/8th of an inch apart facing towards the clarifier 46 and running down the length of each dropline 44, ending just above the level of the opening in the bottom of the clarifier 46. In the preferred embodiment, there are 13 holes, with the holes in each column spaced 3/4th of an inch apart.

What we claim is:

1. A sewage treatment system comprising:
   a cylindrical aerobic tank,
   a cover for said aerobic tank,
   a side tank, and
   a cover for said side tank,
   wherein said side tank is arch-shaped and further comprises a semi-circular wall at one end of said side tank, two approximately parallel side walls, and a connecting wall opposite said semi-circular wall,
   wherein said side tank is connected to said aerobic tank such that said connecting wall of said side tank is formed by a portion of the exterior of said aerobic tank, such that said semi-circular wall of said side tank is the end of said side tank furthest from said aerobic tank and curves towards said aerobic tank, and such that said two approximately parallel side walls of said side tank tangentially connect the open ends of said semi-circular wall of said side tank to said aerobic tank, and
   wherein said semi-circular wall of said side tank has a radius approximately equal to the radius of said aerobic tank.

2. A sewage treatment system as in claim 1 wherein said cover for said aerobic tank and said cover for said side tank are connected to form a single cover which seals both said aerobic tank and said side tank.

3. A sewage treatment system as in claim 1 wherein said aerobic tank and said side tank are composed of concrete.

4. A sewage treatment system as in claim 1 wherein said aerobic tank and said side tank are composed of fibreglass.

5. A sewage treatment system as in claim 2 wherein said aerobic tank and said side tank are composed of concrete.

6. A sewage treatment system as in claim 5 wherein said concrete is wire reinforced.

7. A sewage treatment system as in claim 3 wherein said aerobic tank further comprises:
   a clarifier that divides said aerobic tank into an inner chamber and an outer chamber, one or more air droplines located within said outer chamber of said aerobic tank, and an outlet drain located within said inner chamber of said aerobic tank.

8. A sewage treatment system as in claim 7 wherein:
   said one or more air droplines emit air bubbles in said outer chamber of said aerobic tank at or above the level of the bottom of said clarifier,
   said clarifier further comprises a funnel-shaped main body with top and bottom openings and a lip around the top of said clarifier main body,
   said lip of said clarifier overhangs the top of said aerobic tank,
   said clarifier extends downward within said aerobic tank towards the bottom of said aerobic tank whereby there is a gap between the bottom of said aerobic tank and the bottom opening in said clarifier, and
   said side tank is connected in series with said aerobic tank such that sewage flows between said aerobic tank and said side tank.

9. A sewage treatment system as in claim 6 wherein said semi-circular wall of said side tank, said two approximately parallel side walls of said side tank, and said connecting wall between said side tank and said aerobic tank are thinnest at the top and thicken towards the base.

10. A sewage treatment system as in claim 8 wherein said semi-circular wall of said side tank, said two approximately parallel side walls of said side tank, and said connecting wall between said side tank and said aerobic tank are thinnest at the top and thicken towards the base.

11. A sewage treatment system comprising:
    a cylindrical aerobic tank,
    a cover for said aerobic tank,
    a pre-treatment tank,
    a cover for said pre-treatment tank,
    a post-treatment tank, and
    a cover for said post-treatment tank,
    wherein said pre-treatment tank is arch-shaped and further comprises a semi-circular wall at one end of said pre-treatment tank, two approximately parallel side walls, and a connecting wall opposite said semi-circular wall,
    wherein said pre-treatment tank is connected to said aerobic tank such that said connecting wall of said pre-treatment tank is formed by a portion of the exterior of said aerobic tank, such that said semi-circular wall of said pre-treatment tank is the end of said pre-treatment tank furthest from said aerobic tank and curves towards said aerobic tank, and such that said two approximately parallel side walls of said pre-treatment tank tangentially connect the open ends of said semi-circular wall of said pre-treatment tank to said aerobic tank, and wherein said semi-circular wall of said pre-treatment tank has a radius approximately equal to the radius of said aerobic tank, wherein said post-treatment tank is arch-shaped and further comprises a semi-circular wall at one end of said post-treatment tank, two approximately parallel side walls, and a connecting wall opposite said semi-circular wall, wherein said post-treatment tank is connected to said aerobic tank such that said connecting wall of said post-treatment tank is formed by a portion of the exterior of said aerobic tank, such that said semi-circular wall of said post-treatment tank is the end of said post-treatment tank furthest from said aerobic tank and curves towards said aerobic tank, and such that said two approximately parallel side walls of said post-treatment tank tangentially connect the open ends of said semi-circular wall of said post-treatment tank to said aerobic tank, and wherein said semi-circular wall of said post-treatment tank has a radius approximately equal to the radius of said aerobic tank.

12. A sewage treatment system as in claim 11 wherein said cover for said aerobic tank, said cover for said pre-treatment tank, and said cover for said post-treatment tank are connected to form a single cover which seals said aerobic tank, said pre-treatment tank, and said post-treatment tank.

13. A sewage treatment system as in claim 11 wherein said aerobic tank, said pre-treatment tank, and said post-treatment tank are composed of concrete.

14. A sewage treatment system as in claim 11 wherein said aerobic tank, said pre-treatment tank, and said post-treatment tank are composed of fibreglass.

15. A sewage treatment system as in claim 12 wherein said aerobic tank, said pre-treatment tank, and said post-treatment tank are composed of concrete.

16. A sewage treatment system as in claim 13 wherein said concrete is wire reinforced.

17. A sewage treatment system as in claim 13 wherein said aerobic tank further comprises:

a clarifier that divides said aerobic tank into an inner chamber and an outer chamber, one or more air droplines located within said outer chamber of said aerobic tank, and an outlet drain located within said inner chamber of said aerobic tank.

18. A sewage treatment system as in claim 17 wherein:

said one or more air droplines emit air bubbles in said outer chamber of said aerobic tank at or above the level of the bottom of said clarifier, said clarifier further comprises a funnel-shaped main body with top and bottom openings and a lip around the top of said clarifier main body, said lip of said clarifier overhangs the top of said aerobic tank, said clarifier extends downward within said aerobic tank towards the bottom of said aerobic tank whereby there is a gap between the bottom of said aerobic tank and the bottom opening in said clarifier, and said pre-treatment tank, said aerobic tank, and said post-treatment tank are connected in series such that sewage flows from said pre-treatment tank through said aerobic tank and into said post-treatment tank.

19. A sewage treatment system as in claim 13 wherein said semi-circular wall of said pre-treatment tank, said two approximately parallel side walls of said pre-treatment tank, and said connecting wall between said pre-treatment tank and said aerobic tank are thinnest at the top and thicken towards the base and wherein said semi-circular wall of said post-treatment tank, said two approximately parallel side walls of said post-treatment tank, and said connecting wall between said post-treatment tank and said aerobic tank are thinnest at the top and thicken towards the base.

20. A sewage treatment system as in claim 18 wherein said semi-circular wall of said pre-treatment tank, said two approximately parallel side walls of said pre-treatment tank, and said connecting wall between said pre-treatment tank and said aerobic tank are thinnest at the top and thicken towards the base and wherein said semi-circular wall of said post-treatment tank, said two approximately parallel side walls of said post-treatment tank, and said connecting wall between said post-treatment tank and said aerobic tank are thinnest at the top and thicken towards the base.

21. A sewage treatment system as in claim 20 wherein said concrete is wire reinforced.

22. A sewage treatment system as in claim 20 further comprising a means for chlorinating the effluent.

23. A sewage treatment system as in claim 20 wherein a single cover seals said pre-treatment tank, said aerobic tank, and said post-treatment tank.

24. A sewage treatment system as in claim 20 wherein said post-treatment tank further comprises a means for chlorinating the effluent flowing into said post-treatment tank from said aerobic tank through said outlet drain, said post-treatment tank further comprises a float switch and a pump, whereby said float switch activates said pump when the effluent in said post-treatment tank rises to a certain level, whereby the effluent is pumped out of said post-treatment tank, and a single cover seals said pre-treatment tank, said aerobic tank, and said post-treatment tank.

25. A sewage treatment system comprising:

a cylindrical aerobic tank, a pre-treatment tank, and a post-treatment tank, wherein said pre-treatment tank, said aerobic tank, and said post-treatment tank are composed of wire reinforced concrete and are rigidly joined into a single unit and are connected so that sewage in said pre-treatment tank flows through said aerobic tank and into said post-treatment tank;

a single cover, wherein each of said pre-treatment tank, said aerobic tank, and said post-treatment tank are sealed;

wherein said pre-treatment tank is arch-shaped and further comprises a semi-circular wall at one end of said pre-treatment tank, two approximately parallel side walls, and a connecting wall opposite said semi-circular wall, wherein said pre-treatment tank is connected to said aerobic tank such that said connecting wall of said pre-treatment tank is formed by a portion of the exterior of said aerobic tank, such that said semi-circular wall of said pre-treatment tank is the end of said pre-treatment tank furthest from said aerobic tank and curves towards said aerobic tank, and such that said two approximately parallel side walls of said pre-treatment tank tangentially connect the open ends of said semi-circular wall of said pre-treatment tank to said aerobic tank, and wherein said semi-circular wall of said pre-treatment tank has a radius approximately equal to the radius of said aerobic tank;

wherein said post-treatment tank is arch-shaped and further comprises a semi-circular wall at one end of said post-treatment tank, two approximately parallel side walls, and a connecting wall opposite said semi-circular wall, wherein said post-treatment tank is connected to said aerobic tank such that said connecting wall of said post-treatment tank is formed by a portion of the exterior of said aerobic tank, such that said semi-circular wall of said post-treatment tank is the end of said post-treatment tank furthest from said aerobic tank and curves towards said aerobic tank, and such that said two approximately parallel side walls of said post-treatment tank tangentially connect the open ends of said semi-circular wall of said post-treatment tank to said aerobic tank, and wherein said semi-circular wall of said post-treatment tank has a radius approximately equal to the radius of said aerobic tank;

an inlet port in said pre-treatment tank through which sewage enters said pre-treatment tank;

an overflow conduit, through which sewage flows from said pre-treatment tank into said aerobic tank;

said aerobic tank further comprising;
  a funnel-shaped clarifier with top and bottom openings,
  a plurality of air droplines containing holes, and
  an outlet drain,
    wherein said clarifier divides said aerobic tank into an inner chamber within said clarifier, and an outer chamber between the sidewalls of said aerobic tank and said clarifier; and further wherein said clarifier extends downward in said aerobic tank from near the top of said aerobic tank towards the bottom of said aerobic tank, leaving a gap between the opening in the bottom of said clarifier and the bottom of said aerobic tank such that sewage is able to flow from said outer chamber into said inner chamber of said aerobic tank;

said post-treatment tank further comprising means for chlorinating the effluent flowing into said post-treatment tank from said aerobic tank through said outlet drain;

said clarifier further comprising a funnel-shaped main body, a lip, an offset, and a rim;

wherein said lip of said clarifier overhanging the top of said aerobic tank;

said air droplines being located in said outer chamber of said aerobic tank and emitting air bubbles into said outer chamber at or above the level of the bottom of said clarifier, whereby beneath the level of the bottom of said clarifier there exists a quiescent zone of relatively calm sewage; and said outlet drain further comprising a T-Baffle and an outlet conduit, said T-Baffle being rigidly attached to the open end of said outlet conduit located within said inner chamber of said aerobic tank near the top of said inner chamber, whereby said outlet conduit directs effluent out of said inner chamber of said aerobic tank to said means for chlorinating effluent located within said post-treatment tank.

26. A sewage treatment system as in claim 25 wherein said semi-circular wall of said pre-treatment tank, said two approximately parallel side walls of said pre-treatment tank, and said connecting wall between said pre-treatment tank and said aerobic tank are thinnest at the top and thicken towards the base and wherein said semi-circular wall of said post-treatment tank, said two approximately parallel side walls of said post-treatment tank, and said connecting wall between said post-treatment tank and said aerobic tank are thinnest at the top and thicken towards the base.

27. A sewage treatment system as in claim 26 wherein said post-treatment tank further comprises a float switch and a pump, whereby said float switch activates said pump when the effluent in said post-treatment tank rises to a certain level, whereby the effluent is pumped out of said post-treatment tank.

* * * * *